(12) United States Patent
Tokumasu et al.

(10) Patent No.: US 6,388,357 B1
(45) Date of Patent: *May 14, 2002

(54) ARMATURE WINDING FOR DYNAMO-ELECTRIC MACHINE

(75) Inventors: Tadashi Tokumasu, Tokyo; Hisakazu Matsumoto, Yokohama, both of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,655

(22) Filed: Jul. 26, 1999

(30) Foreign Application Priority Data

Jul. 24, 1998 (JP) ............................................. 10-210038

(51) Int. Cl.⁷ ................................................. H02K 3/00
(52) U.S. Cl. ...................................... 310/198; 310/206
(58) Field of Search ............................... 310/198, 200, 310/201, 206, 203, 202, 195, 179

(56) References Cited

U.S. PATENT DOCUMENTS

| | | | | |
|---|---|---|---|---|
| 2,778,962 A | * | 1/1957 | Taylor | 310/198 |
| 2,778,963 A | | 1/1957 | Habermann | 310/202 |
| 3,152,273 A | * | 10/1964 | Harrington | 310/198 |
| 3,408,517 A | * | 10/1968 | Willyoung | 310/198 |
| 3,601,642 A | * | 8/1971 | Willyoung | 310/198 |
| 3,652,888 A | * | 3/1972 | Harrington | 310/198 |
| 5,654,602 A | * | 8/1997 | Willyoung | 310/179 |

* cited by examiner

*Primary Examiner*—Nestor Ramirez
*Assistant Examiner*—Dang Dinh Le
(74) *Attorney, Agent, or Firm*—Oblon, Spivak, McClelland, Maier & Neustadt, P.C.

(57) ABSTRACT

In a three phase armature winding for a dynamo-electric machine, each phase of the winding comprises a first phase belt for (3n+2) slots and a second phase belt for (3n+1) slots. Three parallel connected circuits each constituting series connected coils per circuit. Each series coil per circuit has an upper coil piece and a lower coil piece connected thereto in series. Each of the upper and lower coil pieces has one connection side end portion and other non-connection side end portion. The first phase belt houses (3n+2) series coils of the circuits and the second phase belt houses (3n+1) series coils thereof. When the circuits in each phase are designated circuit numbers, the circuits in each phase are arranged so that a circuit sequence of the upper coil pieces in each phase belt and a circuit sequence of the lower coil pieces therein are substantially the same. A pair of jumper wires are mounted at the non-connection side end portion side of the series coils in the first phase belt whereby part of the upper coil pieces in the first phase belt and part of the lower coil pieces therein are connected so that the circuit sequence of the part of the upper coil pieces is interchanged with that of the part of the lower coil pieces.

13 Claims, 7 Drawing Sheets

ARMATURE WINDING FOR DYNAMO-ELECTRIC MACHINE

BACKGROUND OF THE INVENTION

1. Field of the Invention

The present invention relates to an armature winding for a dynamo-electric machine such as a two-pole, three-phase turbine generator. The present invention relates to, in particular, an armature winding for a dynamo-electric machine having three parallel connected circuits for each phase.

2. Description of the Prior Art

Normally, an armature winding in a high-capacity turbine generator includes upper coil pieces and lower coil pieces accommodated in upper and lower portions of the slots of a layered core, respectively. The upper coil pieces and the lower coil pieces are connected in series thereby increasing voltage generated at the pieces and the capacity of the generator. When the voltage of the armature winding increases, however, the thickness of the main insulating member of the armature winding increases, with the result that the cross-sectional area of a conductor portion of the armature winding decreases and current density increases so as to cause the increase of loss.

In addition, in an indirect cooling type machine for cooling an armature winding from the outside of the main insulating member of the armature winding, there is the possibility that the thickness of the main insulating member induces an increase in heat resistance of the armature winding, thereby disadvantageously increasing the temperature of the armature winding.

To avoid this disadvantage, while the capacity of a generator is kept unchanged, an armature winding is divided into a plurality of parallel connected circuits so as to decrease generated voltage, thereby decreasing loss and improving cooling capability. In a high capacity generator of indirect cooling type, in particular, it is ordinarily seen that the number of slots increases to increase the cooling circumference. It is, therefore, necessary to provide an armature winding having parallel connected circuits more than three parallel connected circuits.

When an armature winding having more parallel connected circuits than three parallel connected circuits is applied to a two-pole dynamo-electric machine, it is impossible to make the voltage generated at the respective parallel connected circuits completely the same. As a result, circulating current occurs between the parallel connected circuits so that the loss of the armature winding disadvantageously increases. To decrease the circulating current loss, it is essential to reduce the voltage unbalance between the parallel connected circuits as much as possible. To reduce the voltage unbalance between the circuits, it is necessary to specially arrange coils belonging to the respective parallel connected circuits in the respective phase belts.

For example, as disclosed in U.S. Pat. No. 2,778,963 to Rudolf Haberman issued on Jan. 22, 1957, it is necessary to arrange coils of the respective parallel circuits in the respective belts so as to minimize the deviation between the absolute values of the voltages generated at the respective parallel connected circuits and the deviation between phase angles of the respective parallel connected circuits so as to reduce voltage unbalance between the respective parallel connected circuits.

An armature winding of a two-pole, three-phase dynamo-electric machine normally has two phase belts per phase. Thus, by mutually connecting these two phase belts to cancel their counterpart voltage unbalance, voltage unbalance is reduced. However, when the number of slots is odd, the number of coils of the two phase belts do not coincide with each other, in a case of using the above-stated method, it is difficult to reduce voltage unbalance between the circuits. As an example of a method of reducing voltage unbalance in a case where the number of slots is odd, there is disclosed a dynamo-electric machine having 45 slots in U.S. Pat. No. 3,652,888 to Dean Harrington issued on Mar. 28, 1972. According to Harrington, the deviation of phase angles among the three parallel connected circuits is 0.13° to 0.14° . Judging from the standard set by Haberman that the deviation between phase angles is 0.15° or less, it is hard for Harrington to maintain sufficient voltage balance between circuits.

Furthermore, owing to reduce the voltage unbalance, the mechanical structure of the armature winding of Harrington is disadvantageously slightly complicated.

This is because, due to the irregular arrangement of coils belonging to the respective parallel connected circuits in each phase belt, it is necessary to provide a lot of jumper wires for connecting upper and lower coil pieces at each coil end.

To avoid interference between the respective jumper wires, and interference between the respective jumper wires and the connecting portions of the usual respective upper and lower coil pieces to the lead wires, excessive space is required in the dynamo-electric machine so that the length of the dynamo-electric machine increases. In addition, the workload required to connect the large number of jumper wires increases. Furthermore, since each of the jumper wires is longer than the usual upper and lower coil connection pieces, there is the possibility that reliability of the connection portions of the jumper wires and the lead wires is decreased.

SUMMARY OF THE INVENTION

The present invention is directed to overcome the foregoing problems.

Accordingly, it is an object of the present invention to provide a three phase armature winding of a dynamo-electric machine having three parallel connected circuits per phase, wherein two (first and second) phase belts of each phase are arranged in two (first and second) slot groups each having slots and a number of slots of the first slot group is different from a number of slots of the second slot group, which is capable of reducing the number of jumper wires at coil ends and reducing voltage unbalance between parallel connected circuits.

In order to achieve such object, according to one aspect of the present invention, there is provided a three phase armature winding for a dynamo-electric machine, in which the three phase armature winding is disposed in a core, the core having a number of slots, each phase of the armature winding comprising: a first phase belt for a first slot group having (3n+2) slots; a second phase belt for a second slot group having (3n+1) slots; three parallel connected circuits each constituting a number of series connected coils per circuit, each of the series connected coils per circuit having a first coil piece and a second coil piece connected thereto in series, each of the first coil piece and the second coil piece having one end portion and other end portion, the first phase belt housing (3n+2) series connected coils of the parallel connected circuits and the second phase belt housing (3n+1) series connected coils thereof, when the three parallel connected circuits in each phase are designated circuit numbers, respectively, the three parallel connected circuits in each phase being arranged so that a circuit sequence of the circuit numbers of the first coil pieces in each of the first and second phase belts and a circuit sequence of the circuit numbers of the second coil pieces therein are substantially the same; and a pair of connection members mounted at the other end portion side of the series connected coils in the first phase belt whereby part of the first coil pieces in the first phase belt and part of the second coil pieces therein are connected so that the circuit sequence of the part of the first coil pieces is interchanged with that of the part of the second coil pieces.

In preferred embodiment of this aspect, the three phase armature winding is composed of a two layer lap winding, each of the connection members is a jumper wire and the slots are arranged in sequence about a rotor of the core.

In preferred embodiment of this aspect, an arrangement position of each of the jumper wires is determined so that a voltage unbalance among the three parallel connected circuits is reduced and a phase of a highest voltage in voltages induced in the respective parallel connected circuits is lagging with respect to a phase of an average voltage of a whole phase.

In preferred embodiment of this aspect, the first slot group has 11 slots, the second slot group has 10 slots, the first phase belt houses 11 series connected coils, the second phase belt houses 10 series connected coils, when the circuit numbers of the three parallel connected circuits are 1, 2, 3, the circuit sequences of the first and second coil pieces of the parallel connected circuits in the second phase belt are 1, 2, 3, 1, 2, 3, 1, 2, 3, 1 from a beginning of the first coil pieces in the first phase belt toward an end of the second coil pieces in the second phase belt, the circuit sequence of the first coil pieces of the parallel connected circuits in the first phase belt is 2, 3, 1, 3, 2, 1, 3, 2, 1, 3, 2 from the beginning side toward the end side, and wherein the circuit sequence of the second coil pieces of the parallel connected circuits in the first phase belt is 3, 2, 1, 3, 2, 1, 3, 2, 1, 3, 2 from the beginning side toward the end side.

In preferred embodiment of this aspect, the first slot group has 8 slots, the second slot group has 7 slots, the first phase belt houses 8 series connected coils, the second phase belt houses 7 series connected coils, when the circuit numbers of the three parallel connected circuits are 1, 2, 3, the circuit sequence of the first coil pieces of the parallel connected circuits in the first phase belt is 2, 3, 1, 3, 2, 1, 3, 2 from a beginning of the first coil pieces in the first phase belt toward an end of the second coil pieces in the second phase belt, the circuit sequence of the second coil pieces of the parallel connected circuits in the first phase belt is 3, 2, 1, 3, 2, 1, 3, 2 from the beginning side toward the end side, and wherein the circuit sequences of the first and second coil pieces of the parallel connected circuits in the second phase belt are 1, 2, 3, 1, 2, 3, 1 from the beginning side toward the end side.

According to the aspect of the present invention, at the other end in the first phase belt corresponding to the (3n +2) slots, the pair of connection members, such as the pair of jumper wires is provided whereby part of the circuit sequence of the first coil pieces in the first phase belt is changed from part of the circuit sequence of the second coil pieces therein so that the voltage generated at the first coil pieces becomes substantially equal to that generated at the second coil pieces and the number of the remaining first and second coil pieces in the first phase belt becomes apparently substantially equal to that of the first and second coil pieces in the second phase belt. Thus, it is possible to improve the balance of voltages generated at the parallel connected circuits.

Further, in this aspect of the present invention, since only one pair of two jumper wires is provided at the other end portion side of the coils in the first phase belt per phase, it is possible to simplify the structure of the coil end portion so as to shorten the jumper wires and to finally improve reliability for the connection of the coil end portion.

According to this aspect of the present invention, the arrangement positions of the jumper wires are determined so that the unbalance of voltages generated at the three parallel connected circuits is reduced and the highest voltage among those generated at the respective circuits is lagging in phase with respect to the average voltage of the three parallel connected circuits. The circulating current generated due to voltage unbalance among the three parallel connected circuits is lagging in phase by about 90 degrees with respect to the unbalanced voltage so that the voltage which is lagging in phase with respect to the average voltage of the three parallel connected circuits causes circulating current opposite in phase to the armature current which is substantially equal in phase to the average voltage. It is, therefore, possible to suppress the increase of armature current resulting from the circulating current and to suppress the increase of loss resulting from the circulating current.

In accordance with this aspect of the present invention, since a structure of this aspect of the present invention is applied to an armature winding having a first phase belt for 11 slots and a second phase belt for 10 slots, it is possible to provide the same function and advantage described above.

In accordance with this aspect of the present invention, since a structure of this aspect of the present invention is applied to an armature winding having a first phase belt for 8 slots and a second phase belt for 7 slots, it is possible to provide the same function and advantage described above.

In order to achieve such object, according to another aspect of the present invention, there is provided a three phase armature winding for a dynamo-electric machine, in which the three phase armature winding is disposed in a core, the core having a number of slots, each phase of the armature winding comprising: a first phase belt for a first slot group having (6n±2) slots; a second phase belt for a second slot group having (6n±1) slots; three parallel connected circuits each constituting a number of series connected coils per circuit, each of the series connected coils per circuit having a first coil piece and a second coil piece connected thereto in series, each of the first coil piece and the second coil piece having one end portion and other end portion, the first phase belt housing (6n±2) series connected coils of the parallel connected circuits and the second phase belt housing (6n±1) series connected coils thereof, when the three parallel connected circuits in each phase are designated circuit numbers, respectively, the three parallel connected circuits in each phase being arranged so that a circuit sequence of the circuit numbers of the first coil pieces in each of the first and second phase belts and a circuit sequence of the circuit numbers of the second coil pieces therein are substantially the same; a first pair of connection members mounted at the other end portion side of the series connected coils in the first phase belt whereby part of the first coil pieces in the first phase belt and part of the second coil pieces therein are connected so that the circuit sequence of the part of the first coil pieces is interchanged with that of the part of the second coil pieces; and a second pair of connection members mounted at the one end portion side of the series connected coils in the second phase belt whereby part of the first coil pieces in the second phase belt and part of the second coil pieces therein are connected so that the circuit sequence of the part of the first coil pieces is interchanged with that of the part of the second coil pieces.

In preferred embodiment of this another aspect, the first slot group has 10 slots, the second slot group has 11 slots, the first phase belt houses 10 series connected coils, the second phase belt houses 11 series connected coils, when the circuit numbers of the three parallel connected circuits are 1, 2, 3, the circuit sequence of the first coil pieces of the parallel connected circuits in the first phase belt is 1, 2, 3, 1, 2, 3, 1, 3, 2, 1 from a beginning of the first coil pieces in the first phase belt toward an end of the second coil pieces in the second phase belt, the circuit sequence of the second coil pieces of the parallel connected circuits in the first phase belt is 1, 2, 3, 1, 3, 2, 1, 3, 2, 1 from the beginning side toward the end side, and wherein the circuit sequences of the first and second coil pieces of the parallel connected circuits in the second phase belt are 3, 2, 1, 3, 2, 1, 2, 3, 1, 2, 3 from the beginning side toward the end side.

In preferred embodiment of this another aspect, the first slot group has 8 slots, the second slot group has 7 slots, the first phase belt houses 8 series connected coils, the second phase belt houses 7 series connected coils, when the circuit numbers of the three parallel connected circuits are 1, 2, 3, the circuit sequence of the first coil pieces of the parallel connected circuits in the first phase belt is 2, 3, 1, 2, 3, 1, 3, 2 from a beginning of the first coil pieces in the first phase belt toward an end of the second coil pieces in the second phase belt, the circuit sequence of the second coil pieces of the parallel connected circuits in the first phase belt is 2, 3, 1, 3, 2, 1, 3, 2 from the beginning side toward the end side, and wherein the circuit sequences of the first and second coil pieces of the parallel connected circuits in the second phase belt are 1, 3, 2, 1, 2, 3, 1 from the beginning side toward the end side.

According to this another aspect of the present invention, a pair of connection members, such as, jumper wires connect the first coil pieces and the second coil pieces in the first phase belt whereby part of the circuit sequence of the first coil pieces in the first phase belt is changed from part of the circuit sequence of the second coil pieces therein. In addition, another pair of connection members, such as jumper wires connect the first coil pieces and the second coil pieces in the second phase belt whereby part of the circuit sequence of the first coil pieces in the second phase belt is changed from part of the circuit sequence of the second coil pieces therein.

As a result, since the arrangement of circuit sequences indicating the arrangement of the parallel connected circuits are symmetrical about the center of each phase belt, the phase angles of the voltages generated at the respective parallel connected circuits substantially coincide with each other, thereby making it possible to reduce voltage unbalance among the parallel connected circuits.

Further, in this another aspect of the present invention, since each of pairs jumper wires is provided at each of the one end side and the other end side of the coils, it is possible to simplify the structures of the both coil end portions so as to shorten the jumper wires and to finally improve reliability for the connection of the coil end portions.

In accordance with this another aspect of the present invention, since a structure of this another aspect of the present invention is applied to an armature winding having a first phase belt for 10 slots and a second phase belt for 11 slots, it is possible to provide the same function and advantage described above.

In accordance with this another aspect of the present invention, since a structure of this another aspect of the present invention is applied to an armature winding having a first phase belt for 8 slots and a second phase belt for 7 slots, it is possible to provide the same function and advantage described above.

In order to achieve such object, according to further aspect of the present invention, there is provided a three phase armature winding for a dynamo-electric machine, in which the three phase armature winding is disposed in a core, the core having a number of slots, each phase of the armature winding comprising: a first phase belt for a first slot group having (6n±2) slots; a second phase belt for a second slot group having (6n±1) slots; three parallel connected circuits each constituting a number of series connected coils per circuit, each of the series connected coils per circuit having a first coil piece and a second coil piece connected thereto in series, each of the first coil piece and the second coil piece having one end portion and other end portion, the first phase belt housing (6n±2) series connected coils of the parallel connected circuits and the second phase belt housing (6n±1) series connected coils thereof, when the three parallel connected circuits in each phase are designated circuit numbers, respectively, the three parallel connected circuits in each phase being arranged so that a circuit sequence of the circuit numbers of the first coil pieces in each of the first and second phase belts and a circuit sequence of the circuit numbers of the second coil pieces therein are substantially the same; a first pair of connection members mounted at the other end portion side of the series connected coils in the first phase belt whereby part of the first coil pieces in the first phase belt and part of the second coil pieces therein are connected so that the circuit sequence of the part of the first coil pieces is interchanged with that of the part of the second coil pieces; and second two pairs of connection members mounted at the other end portion side of the series connected coils in the second phase belt whereby two pairs of the first coil pieces and the second coil pieces in the second phase belt are connected so that the circuit sequence of the paired first coil pieces is interchanged with that of the paired second coil pieces.

In preferred embodiment of this further aspect, the first slot group has 10 slots, the second slot group has 11 slots, the first phase belt houses 10 series connected coils, the second phase belt houses 11 series connected coils, when the circuit numbers of the three parallel connected circuits are 1, 2, 3, the circuit sequence of the first coil pieces of the parallel connected circuits in the first phase belt is 1, 2, 3, 1, 2, 3, 1, 3, 2, 1 from a beginning of the first coil pieces in the first phase belt toward an end of the second coil pieces in the second phase belt, the circuit sequence of the second coil pieces of the parallel connected circuits in the first phase belt is 1, 2, 3, 1, 3, 2, 1, 3, 2, 1 from the beginning side toward the end side, the circuit sequence of the first coil pieces of the parallel connected circuits in the second phase belt is 3, 2, 1, 3, 2, 1, 2, 3, 1, 2, 3 from the beginning side toward the end side, and wherein the circuit sequence of the second coil pieces of the parallel connected circuits in the second phase belt is 3, 2, 1, 2, 3, 1, 2, 3, 1, 3, 2 from the beginning side toward the end side.

According to the further aspect of the present invention, a pair of connection members, such as, jumper wires connect the first coil pieces and the second coil pieces in the first phase belt whereby part of the circuit sequence of the first coil pieces in the first phase belt is changed from part of the circuit sequence of the second coil pieces therein. In addition, another two pairs of connection members, such as two pairs of jumper wires connect the first coil pieces and the second coil pieces whereby two parts of the circuit sequence of the first coil pieces in the second phase belt are changed from two parts of the circuit sequence of the second coil pieces therein, respectively. As a result, the arrangement of circuit sequences indicating the arrangement of the parallel connected circuits is symmetrical about the center of each phase belt. Therefore, the phase angles of the voltages generated at the respective parallel connected circuits substantially coincide with each other, thereby making it possible to reduce voltage unbalance among the parallel connected circuits.

BRIEF DESCRIPTION OF THE DRAWINGS

Other objects and aspects of the present invention will become apparent from the following description of embodiments with reference to the accompanying drawings in which.

DETAILED DESCRIPTION OF THE PREFERRED EMBODIMENTS

Figure 1:
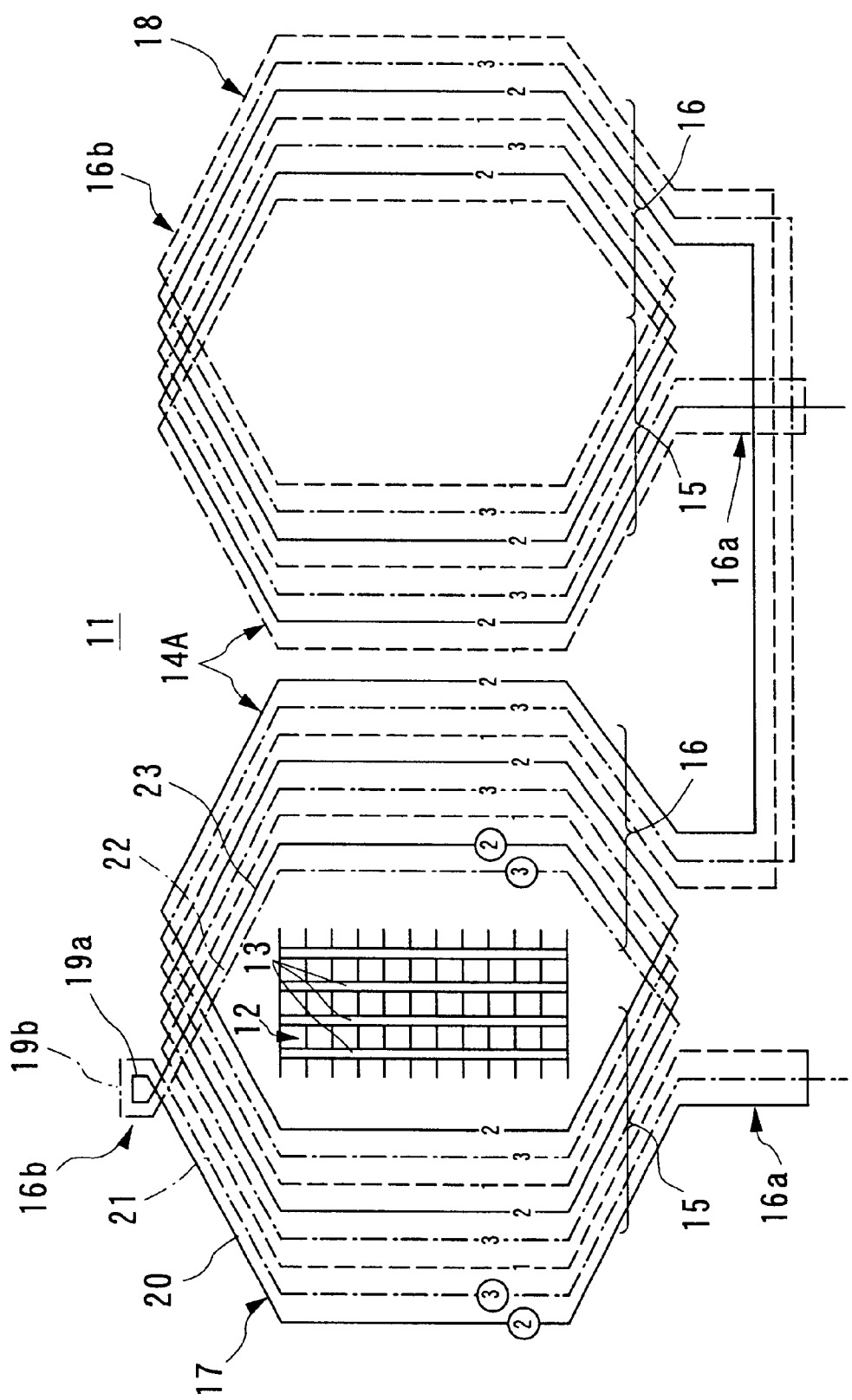
FIG. 1 is a developed view of one phase of an armature winding according to a first embodiment of the present invention.

The embodiments of the present invention will be described hereinafter according to FIGS. 1 to 7. It is noted that same or equivalent elements are denoted by the same reference numerals throughout the drawings and that repetition descriptions of the elements are omitted.

FIG. 1 is a development of an armature winding 11 for a dynamo-electric machine such as a turbine generator according to a first embodiment of the present invention.

The armature winding 11 is, for example, a two layer lap winding and is accommodated in upper and lower portions (top and bottom portions) of slots 13. The slots 13 are provided in an armature winding core 12 of a layered core of two-pole, three-phase dynamo-electric machine.

Incidentally, it is noted that FIG. 1 shows only one phase 14A of the winding 11 in three phases 14 thereof and that the remaining other two phases 14B, 14C thereof are identically arranged to the phase 14A except that they are displaced 120 and 240 electrical degrees on one side of the phase 14A, respectively. In this embodiment, for example, a number of slots 13 is 45, and therefore, the three phases 14A–14C of the winding 11 are contained within the 45 slots 13, respectively. That is, in a case of 45 slots 13, 15 slots 13 are allocated to each of the phases 14A–14C of the winding 11.

The phase 14A of the armature winding 11 comprises two phase belts (first phase belt 17 and second phase belt 18) so that the first and second phase belts 17 and 18 of each phase are arranged in sequence about the core 12. Each of the phase belts comprises a section of the three parallel connected circuits in the corresponding phase. Incidentally, the parallel connected circuits are designated arbitrary as circuit numbers 1, 2 and 3, respectively, as shown in FIG. 1, each circuit in the section consisting of series connected coils each constituting upper coil piece (top coil piece) 15 and a lower coil piece (lower coil piece) 16 which are connected to each other in series.

The upper coil pieces 15 are contained in upper portions (top portions) of the slots 13 and the lower coil pieces (bottom coil pieces) 16 are contained in lower portions (bottom portions) thereof.

The two sections of the three parallel connected circuits in the first and second phase belts 17 and 18 in phase 14A are properly poled and connected in series relation.

Each of the upper coil pieces 15 in each phase belt is provided at one end with a connection side coil end 16a connected to a lead wire portion (not shown) of the phase 14A or corresponding lower coil piece 16 in each phase belt. Each of the upper coil pieces 15 is also provided at other end with a non-connection side coil end each of which is connected to each of the lower coil pieces 16 but which is not connected to the lead wire portion.

The first phase belts 17 is adapted to house the eight coils with the upper coil pieces 15 and the lower coil pieces 16 in a first slot group comprising eight slots 13 and the second phase belts 18 is adapted to house the seven coils with the upper coil pieces 15 and the lower coil pieces 16 in a second slot group comprising seven slots 13.

Incidentally, the circuit numbers are designated to specify the parallel connected circuits just for the sake of description and the parallel connected circuits may be designated any numbers in any sequence. Furthermore, in FIG. 1, the parallel connected circuit 1, 2 and 3 are indicated by a broken line, a solid line and a dashed line, respectively.

The upper coil pieces 15 in the first and second phase belts 17 and 18 are connected to the corresponding lower coil pieces 16 therein at the connection side coil end portions 16a and the non-connection side coil end portions 16b while the coils a re spaced apart from each other at a predetermined coil pitch, and the series connected coils of the corresponding parallel connected circuits in the phase belts 17 and 18 are connected to each other by inter-pole connecting lines thereby forming serial coils. FIG. 1 shows an example in which the coil pitch at the non-connection side is as small as ⅔. This pitch is provided for purposes of making the drawing look simple and the coil pitch should not be limited to ⅔.

The armature winding 14A is basically constituted such that the parallel connected circuits 1 to 3 of the upper coil pieces 15 and the lower coil pieces 16 in the first and second phase belts 17 and 18 are arranged in the same sequence.

However, in the first phase belt 17, a pair of jumper wires 19a and 19b is provided at the non-connection side coil end portion 16b side in th e first phase belt 17, whereby the upper coil pieces 20 and 21 respectively forming part of the parallel connected circuits 2 and 3 and the lower coil pieces 22 and 23 respectively forming part of the parallel connected circuits 3 and 2 in the first phase belts 17 are connected so that part of the circuit sequence of the parallel connected circuits 2 and 3 are replaced between the upper and lower coil pieces 15 and 16.

That is, one of the jumper wires 19a connects the non-connection side coil end 16b of the upper coil piece 20 forming part of the parallel connected circuit 2 and the non-connection side coil end 16b of the lower coil piece 23 forming part of the parallel connected circuit 2, which should inherently form part of the parallel connected circuit 3, whereas the other jumper wire 19b connects the non-connection side coil end 16b of the upper coil piece 21 forming part of the parallel connected circuit 3 and the non-connection coil end 16b of the lower coil piece 22 forming part of the parallel connected circuit 3, which should inherently form part of the parallel connected circuit 2.

As a result of replacing part of the circuit sequences of the parallel connected circuits 2 and 3, the sequence of the upper coil pieces 15 of the parallel connected circuits 1, 2 and 3 in the first phase belts 17 is 2, 3, 1, 3, 2, 1, 3, 2 from the beginning of the first phase belt 17, i.e., the left-end upper coil piece 15 in FIG. 1 toward the end of the second phase belt 18, i.e., the right-end lower coil piece 16 in FIG. 1. The sequence of the lower coil pieces 16 of the parallel connected circuits 1, 2 and 3 in the same first phase belts 17 is 3, 2, 1, 3, 2, 1, 3, 2.

That is, the upper coil piece 15 at the left end and that adjacent the left-end coil piece on the right side in the first phase belts 17 in FIG. 1 are arranged to be interchanged with the lower coil piece 16 at the left end and that adjacent the left-end coil piece on the right side in the first phase belt 17. On the other hand, since the second phase belts 18 is not provided with jumper wires, the sequence of the upper coil pieces 15 and that of the lower coil pieces 16 of the parallel connected circuits 1 to 3 are the same, i.e., 1, 2, 3, 1, 2, 3, 1 from the left end toward the right end in the second phase belts 18 in FIG. 1.

Meanwhile, to reduce the unbalance of voltages generated at the parallel connected circuits 1, 2 and 3 means to reduce the differences between the voltages generated at the parallel connected circuits 1 to 3 and the average voltage of the three parallel connected circuits 1 to 3 as a whole phase. In order to realize the object of reducing the voltage differences, it is necessary, quite obviously, to make the phases of the voltages generated at the respective parallel connected circuit 1 to 3 closer to that of the average voltage as the whole phase.

In this respect, the parallel connected circuit 1 consists of two sets (pairs) of upper and lower coil pieces 15 and 16 in the first phase belts 17 and three sets of upper and lower coil pieces 15 and 16 in the second phase belt 18. These coil pieces in the respective phase belts 17 and 18 are arranged symmetrically with respect to the centers of the respective phase belts 17 and 18 so that, obviously, the phase of voltage generated at the first parallel connected circuit 1 coincides with that of the average voltage as the entire phase almost completely.

Therefore, in order to reduce voltage unbalance among the parallel connected circuits 1 to 3, it is necessary to make the phases of the voltages generated at the parallel connected circuits 2 and 3 closer to that of the average voltage as the entire phase. In other words, it is necessary to make the phases of the voltage generated at the parallel connected circuits 2 and 3 closer to each other.

Since each of the parallel connected circuits 2 and 3 consists of three sets of upper and lower coil pieces 1 and 16 in the first phase belts 17 and two sets of upper and lower coil pieces 15 and 16 in the second phase belt 18, it is impossible to arrange the coil pieces in the respective phase belts 17 and 18 symmetrically with respect to the centers of the respective phase belts 17 and 18 so as not to make the phases of the voltages generated at the circuits 2 and 3 completely coincide with the phase of the average voltage as the entire phase. In other words, it is impossible to make the phases of the voltages generated at the parallel connected circuits 2 and 3 completely coincide with each other.

Incidentally, the other phases 14B and 14C of the armature winding 11 has the same structure of the phase 14A thereof, so that circuit sequences of the other phases 14B and 14C in the first phase belts 17 and the second phase belts 18 are identical to those of the phase 14A therein. Therefore, the descriptions of the structures of the phases 14B and 14C are omitted.

Next, the operation of the present embodiment will be described based on FIG. 2.

Figure 2A:
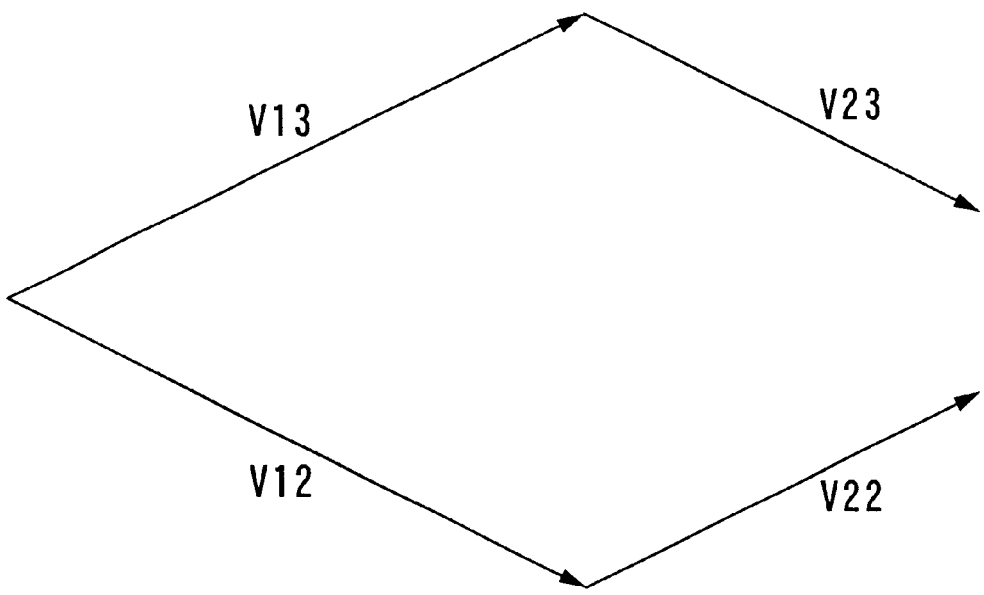
FIG. 2A is a typical view of the voltage generated at a phase of a conventional armature winding.

First, description will be given to a case where a set of two jumper wires 19a and 19b are not provided. In this case, the arrangement of the parallel connected circuits 1 to 3 in the first phase belts 17 and that in the second phase belts 18 are the same between the upper and lower coils 15 and 16. The circuit sequence from the beginning of the first phase belt 17, i.e., the left-end upper coil piece 15 in FIG. 1 toward the end of the second phase belt 18, i.e., the right-end lower coil piece 16 in FIG. 1, is 3, 2, 1, 3, 2, 1, 3, 2 in the first phase belts 17 and 1, 2, 3, 1, 2, 3, 1 in the second phase belt 18. FIG. 2A is a typical view showing the voltages generated at the parallel connected circuits 2 and 3.

In FIG. 2A, V12 and V13 represent voltages generated at the parallel connected circuits 2 and 3 in the first phase belt 17, respectively. V22 and V23 represent voltages generated at the parallel connected circuits 2 and 3 in the second phase belt 18, respectively. That is, the tens-digit subscript represents a phase belt and the units-digit subscript represents a parallel connected circuits 1, 2 or 3. The sequences of the parallel connected circuits 1 to 3 in the two phase belts 17 and 18 are selected such that the phase difference between V12 and V13 is opposite in phase to that between V22 and V23 in the parallel connected circuit 2.

However, V12 represents the voltage generated in three sets of upper and lower coil pieces 15 and 16, whereas V22 represents the voltage generated in the two sets of upper and lower coil pieces 15 and 16 so that, due to the difference in the number of coils, it is insufficient to cancel the phase difference between the parallel connected circuits 2 and 3.

Figure 2B:
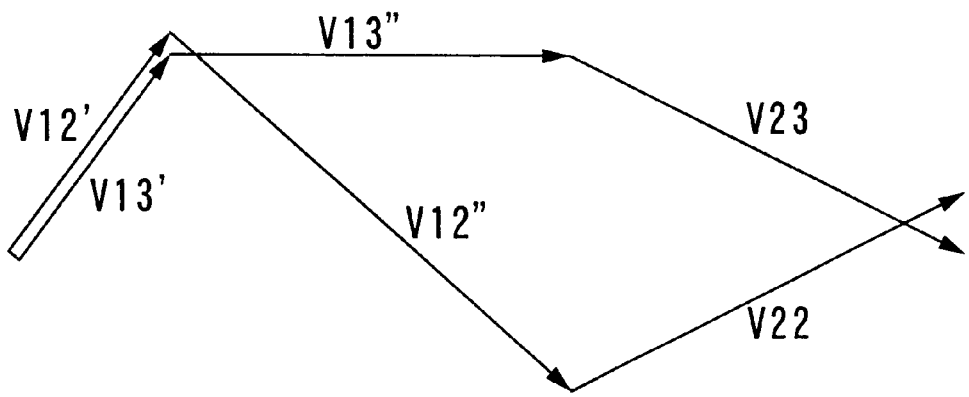
FIG. 2B is a typical view of the voltage generated at the phase of the armature winding according to the first embodiment of the present invention shown in FIG. 1.

On the contrary, FIG. 2B is a typical view showing the voltages generated at the parallel connected circuits 2 and 3 in this embodiment. In this embodiment, a set of two jumper wires 19a and 19b connect the upper and lower coil pieces so that the circuit numbers 3 and 2 of the lower coil pieces 22 and 23 in the first phase belts 17 are replaced to the circuit numbers 2 and 3 of the upper coil pieces 20 and 21, respectively, so that the phase difference between the composite voltage V12' of the voltages generated at the upper coil piece 20 and the lower coil piece 23 of the parallel connected circuit 2 and the composite voltage V13' of the voltages generated at the upper coil piece 21 and the lower coil piece 22 of the parallel connected circuit 3 is substantially equal.

In addition, in a case where the voltages generated at the remaining upper and lower coil pieces 15 and 16 of the parallel connected circuits 2 and 3 in the first phase belts 17 are assumed as V12" and V13", respectively, the phase difference between V12" and V13" is opposite in phase to that between V22 and V23, and both of the voltages V12" and V13" are composite voltages of the voltages generated at the same number of upper and lower coil pieces 15 and 16, respectively. It is, therefore, possible to reduce the phase difference of voltages between the parallel connected circuits 2 and 3 as a whole.

Next, the unbalance of generated voltages in one phase will be described. Here, as means for evaluating voltage unbalance numerically, the following definition is normally employed. That is, the voltage of any one of a number of parallel connected circuits in one phase, that is, p.u. (per unit) voltage comprises the ratio between the open-circuit voltage (no-load voltage) generated in the one circuit and the rated voltage of the phase, and is a measure of the magnitude of voltage unbalance between the one circuit and the phase. Similarly, the phase angle displacement between the open-circuit voltage generated in the one circuit and the rated voltage of the phase is a measurement of the phase angle of voltage unbalance the one circuit and the phase.

Next Table 1 shows the degree of balance of voltage generated at the armature winding 11 (phase 14A) in the first embodiment according to the present invention. Since the degree of balance varies depending on the coil pitch, Table 1 shows a case where the coil pitch is 19/22.5 (84.44%). As shown in Table 1, the phase 14A of the armature winding 11 in the first embodiment exhibits a high degree of balance, that is, a maximum 0.34% of the deviation of the magnitude of voltage (that of p.u. voltage toward 1.0) and a deviation of phase angles of 0.121 degrees.

The deviation of phase angles, in particular, satisfies the standard as taught by Haberman cited above, that is, the deviation of the absolute values of voltages among the parallel connected circuits 1 to 3 is 0.4% and the deviation of phase angles is less than 0.15 degrees. In addition, the phase angle is improved from 0.13 degrees to 0.14 degrees in Harrington.

TABLE 1

| Circuit Number | 1 | 2 | 3 |
|---|---|---|---|
| Voltage magnitude (p.u.) | 1.0016 | 0.9966 | 1.0018 |
| Voltage phase angle (deg.) | 0.000 | 0.121 | −0.121 |

As described above, since only a set of two jumper wires 19a and 19b are provided for each phase 14 of the armature winding 11, it is possible to minimize the increase of the axial dimensions of the non-connection side coil end portions 16b due to the provided jumper wires 19a and 19b and the increase of workload resulting from the connection of the two jumper wires 19a and 19b. Further, since the jumper wires 19a and 19b interchange the two adjacent lower coil pieces 22 and 23 with each other, the length of the jumper wires 19a and 19b themselves can be minimal, thereby making it possible to improve reliability for the connecting portions of the jumper wires.

Moreover, since voltage unbalance among the parallel connected circuits 1 to 3 is reduced, it is possible to reduce circulating current among the parallel connected circuits 1 to 3 so as to prevent the winding from overheating and efficiency from decreasing according to the circulating current loss, thereby providing the armature winding 11 having a highly efficient and a highly reliability.

Figure 3:
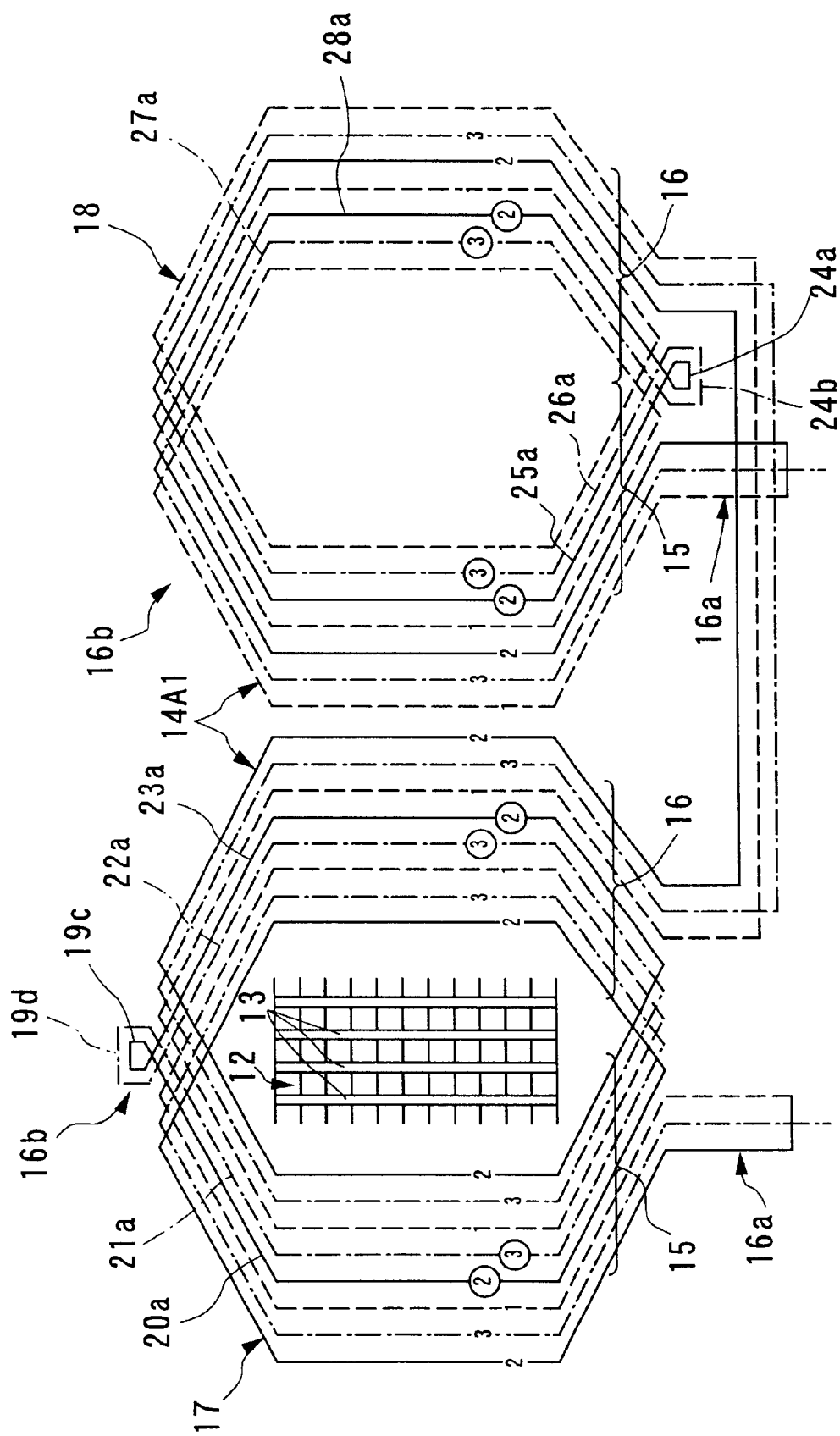
FIG. 3 is a developed view of a phase of an armature winding according to a second embodiment of the present invention.

FIG. 3 is a developed view of an armature winding 14A1 in one phase of a turbine generator according to the second embodiment of the present invention.

In the armature winding (phase) 14A1, (6n±2) slots 13 of the core 12 are classified as the first slot group corresponding to the first phase belt 17, and (6n±1) slots 13 thereof are classified as the second slot group corresponding to the second phase belt 18. That is, in a case where a number of slots of the core is 45, eight slots 13 are classified as the first slot group corresponding to the first phase belt 17, and seven slots 13 are classified as the second slot group corresponding to the second phase belt 18.

Furthermore, in this embodiment, two sets of jumper wires 19c and 19d and 24a and 24b are provided in the phase belts 17 and 18 of the phase 14A1 of the armature winding 11.

That is, the set of two jumper wires 19c and 19d is provided at the non-connection side coil end portion 16b side in the first phase belt 17, whereby the fourth and fifth upper coil pieces 20a and 21a from the first upper coil piece 15 (left-end piece in FIG. 3) in the first phase belt 17, which have circuit numbers 2 and 3, respectively, and the fourth and fifth lower coil pieces 22a and 23a from the beginning of the lower coil pieces 16 (left-end piece in FIG. 3) in the first phase belt 17, which have circuit numbers 3 and 2, respectively, are connected through the respective non-connection side end portions 16b so that the circuit sequence of the fourth and fifth upper coil pieces 20a and 21a is interchanged with that of the fourth and fifth lower coil pieces 22a and 23a.

On the other hand, the set of two jumper wires 24a and 24b is provided at a connection-side coil end portion 16a side in the second phase belt 18, whereby the fifth and sixth upper coil pieces 25a and 26a from the beginning of the upper coil pieces (left-end piece in FIG. 3) in the second phase belt 18, which have circuit numbers 2 and 3, respectively, and the second and third lower coil pieces 27a and 28a from the beginning of the lower coil pieces 16 (left-end piece in FIG. 3) in the second phase belt 17, which have circuit numbers 3 and 2, respectively, are connected through the respective connection-side end portions 16a so that the circuit sequence of the fifth and sixth upper coil pieces 25a and 26a is interchanged with that of the second and third lower coil pieces 27a and 28a.

Therefore, the circuit sequence (arrangement) of the upper coil pieces 15 in the first phase belts 17 indicating the arrangement of the parallel connected circuits 1 to 3 is 2, 3, 1, 2, 3, 1, 3, 2 and that of the lower coil pieces 16 in the first phase belts 17 is 2, 3, 1, 3, 2, 1, 3, 2 from the beginning side of the upper coil pieces 15 or the left-end piece toward right side (end side) in FIG. 3.

On the other hand, the circuit sequence (arrangement) of the upper coil pieces 15 of the parallel connected circuits 1 to 3 in the second phase belts 18 and that of the lower coil pieces 16 of the parallel connected circuits 1 to 3 therein are identically 1, 3, 2, 1, 2, 3, 1 from the beginning side toward the end side.

Incidentally, the other phases 14B1 and 14C1 of the armature winding 11 has the same structure of the phase 14A1 thereof, so that circuit sequences of the other phases 14B1 and 14C1 in the first phase belts 17 and the second phase belts 18 are identical to those of the phase 14A1 therein. Therefore, the descriptions of the structures of the phases 14B1 and 14C1 are omitted.

In this embodiment, similar to the first embodiment shown in FIG. 1, the phase of the voltage generated at the parallel connected circuit 1 is the same as that of the average voltage of the whole phase due to symmetrical arrangement. In addition, the phases of the voltages generated at the two sets of the upper and lower coil pieces 15 and 16 of the parallel connected circuits 2 and 3 in the second phase belts 18 are the same as the phase of the average voltage of the whole phase due to symmetrical arrangement. The phases of the voltages generated at the three sets of the upper and lower coils 15 and 16 of the parallel connected circuits 2 and 3 in the first phase belts 17 are also the same as the phase of the average voltage of the whole phase due to the mirror relationship wherein, in a case where a pair of adjacent upper coil pieces 15 (circuit numbers 2, 3) is interchanged with each other, the circuit sequence of the upper coil pieces 15 is mirror symmetrical with that of the lower coil pieces 16. Thus, all of the phases of the voltages generated at the three parallel connected circuits 1 to 3 are the same as the phase of the average voltage of the whole phase so that a high degree of balance of generated voltages of the three parallel connected circuits 1 to 3 can be obtained as shown in Table 2 below. Incidentally, the deviations between the magnitude of the voltages generated at the respective parallel connected circuits 1 to 3 and the average voltage of the whole phase cause the driving force of the circulating current across the parallel connected circuits 1 to 3, it is natural that, in a case where the phase differences of all of the circuits 1 to 3 are almost completely zero as shown in Table 2, the circulating current induced in the circuits 1 to 3 is lower than the circulating current, in a case where the deviations of the magnitudes of the voltages generated at the parallel connected circuits 1 to 3 are the same but the phase differences between the generated voltages at the parallel connected circuits 1 to 3 are not zero, induced in the circuits 1 to 3.

TABLE 2

| Circuit Number | 1 | 2 | 3 |
|---|---|---|---|
| Voltage magnitude (p.u.) | 1.0016 | 0.9970 | 1.0014 |
| Voltage phase angle (deg.) | 0.000 | 0.000 | 0.000 |

As described above, by proving only two sets of (that is, four) jumper wires 19c and 19d, and 24a and 24b for each phase, it is possible to reduce voltage unbalance among the parallel connected circuits 1 to 3. Thus, it is possible to minimize the increase of the axial dimensions of the coil ends 16a and 16b due to the installed jumper wires 19c and 19d, and 24a and 24b, respectively, and the increase of workload resulting from the connection of the jumper wires 19c, 19d, 24a and 24b. Although these effects in this embodiment are smaller than those recited in claim 1, a higher degree of voltage balance can be obtained in this embodiment, making it possible to prevent the increase of loss and temperature rise caused by circulating current.

Figure 4:
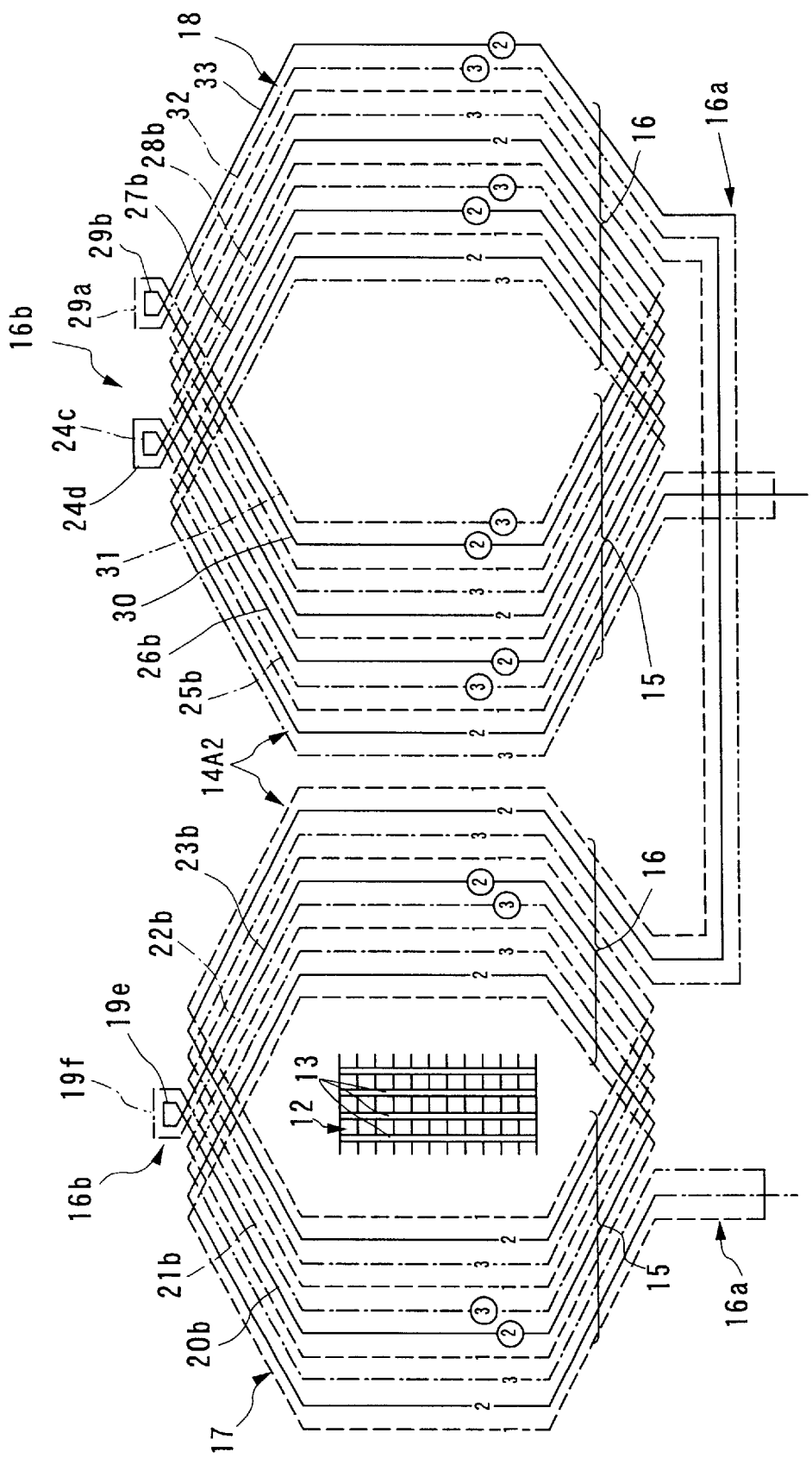
FIG. 4 is a developed view of a phase of an armature winding according to a third embodiment of the present invention.

FIG. 4 is a development of an armature winding 14A2 of a turbine generator according to the third embodiment of the present invention. In this embodiment, for example, a number of slots 13 is 63, and therefore, the three phases 14A2–14C2 of the winding 11 are contained within the 63 slots 13, respectively. That is, in a case of 63 slots 13, 21 slots 13 are allocated to each of the phases 14A2–14C2 of the winding 11.

In the armature winding (phase) 14A2, (6n±2) slots 13 of the core 12 are classified as the first slot group corresponding to the first phase belt 17, and (6n±1) slots 13 thereof are classified as the second slot group corresponding to the second phase belt 18. That is, in a case where a number of slots of the core is 63, ten slots 13 are classified as the first slot group corresponding to the first phase belt 17, and eleven slots 13 are classified as the second slot group corresponding to the second phase belt 18.

The first phase belts 17 is adapted to house the ten coils with the upper coil pieces 15 and the lower coil pieces 16 in the first slot group of ten slots 13 and the second phase belts 18 is adapted to house the eleven coils with the upper coil pieces 15 and the lower coil pieces 16 in the second slot group of eleven slots 13.

Furthermore, in this embodiment, three sets of jumper wires 19e and 19f, 24c and 24d and 29a and 29b are provided in the phase 14A2 of the armature winding in.

That is, the set of two jumper wires 19e and 19f is provided at the non-connection side coil end portion 16b side in the first phase belt 17, whereby the fifth and sixth upper coil pieces 20b and 21b from the beginning of the upper coil pieces 15 (left-end piece in FIG. 4), which have circuit numbers 2 and 3, respectively, and the fifth and sixth lower coil pieces 22b and 23b from the beginning of the lower coil pieces 16 (left-end piece in FIG. 4), which have circuit numbers 3 and 2, respectively, are connected so t hat the circuit sequence of the fifth and sixth upper coil pieces 20b and 21b is interchanged with th at of the fifth and sixth lower coil pieces 22b and 23b.

On the other hand, the two sets of (that is, four) jumper wires 24c and 24d, and 29a and 29b are provided at the non-connection side coil end portion 16b side in the second phase belt 18. That is, by the set of two jumper wires 24c and 24d, the fourth and fifth upper coil pieces 25b and 26b from the beginning of the upper coil pieces 15 (left-end piece in FIG. 4) toward the right side in the second phase belt 18, which have circuit numbers 3 and 2, respectively, and the fourth and f if th lower coil pieces 27b and 28b from the beginning of the lower coil pieces 16 toward the end thereof in the second phase belt 18, which have circuit numbers 2 and 3, respectively, are connected so that the circuit sequence of the fourth and fifth upper coil pieces 25b and 26b is interchanged with that of the fourth and fifth lower coil pieces 27b and 28b.

In addition, by the set of two other jumper wires 29a and 29b, the tenth and eleventh upper coil pieces 30 and 31 from the beginning of the upper coil pieces in the second phase belt 18, which have circuit numbers 2 and 3, respectively, and the tenth and eleventh lower coil pieces 32 and 33 from the beginning of the lower coil pieces 16, which have circuit numbers 3 and 2, respectively, are connected so that the circuit sequence of the tenth and eleventh upper coil pieces 30 and 31 is interchanged with that of the tenth and eleventh lower coil pieces 32 and 33.

Therefore, the circuit sequence of the upper coil pieces 15 in the first phase belts 17 indicating the arrangement of the parallel connected circuits 1 to 3 is 1, 2, 3, 1, 2, 3, 1, 3, 2, 1 from the beginning of the upper coil pieces 15 or the left-end piece in FIG. 4 and the circuit sequence of the lower coil pieces 16 is 1, 2, 3, 1, 3, 2, 1, 3, 2, 1 from the beginning of the lower coil pieces 16.

On the other hand, the circuit sequence of the upper coil pieces 15 in the second phase belts 18 indicating the arrangement of the parallel connected circuits 1 to 3 is 3, 2, 1, 3, 2, 1, 2, 3, 1, 2, 3 from the beginning of the upper coil pieces 15 (left-end piece) toward the right side, and the circuit sequence of the lower coil pieces is 3, 2, 1, 2, 3, 1, 2, 3, 1, 3, 2 from the beginning of the upper coil pieces (left-end piece) toward the right side.

Incidentally, the other phases 14B2 and 14C2 of the armature winding 11 has the same structure of the phase 14A2 thereof, so that circuit sequences of the other phases 14B2 and 14C2 in the first phase belts 17 and the second phase belts 18 are identical to those of the phase 14A2 therein. Therefore, the descriptions of the structures of the phases 14B2 and 14C2 are omitted.

Therefore, in this embodiment, similar to the first embodiment shown in FIG. 1, the phase of the voltage generated at the parallel connected circuit 1 is the same as that of the average voltage of the whole phase due to symmetrical arrangement.

In addition, the phases and the absolute values of the voltages generated at the three sets of the upper and lower coils 15 and 16 of the parallel connected circuits 2 and 3 in the first phase belts 17 are substantially identical with each other due to the mirror relationship wherein, when the arrangements of parts of the upper coil pieces 15 (circuit number 2, 3) are interchanged with each other, the circuit sequence of the upper coil pieces 15 is mirror symmetrical with that of the lower coil pieces 16.

On the other hand, the phases of the voltages generated at the upper coil pieces 15 of the parallel connected circuits 2 and 3 in the second phase belts 18 are the same as the phase of the average voltage of all of the upper coil pieces 15 in the second phase belts 18 due to symmetric arrangement. Furthermore, the phases and the absolute values of the voltages generated at the lower coils 16 of the parallel connected circuits 2 and 3 in the second phase belts 18 are substantially identical with each other due to the mirror relationship wherein, when the arrangements of parts of the upper coil pieces 15 (circuit number 2, 3) are interchanged with each other, the circuit sequence of the upper coil pieces 15 is mirror symmetrical with that of the lower coil pieces 16.

Owing to this, the voltages generated at the parallel connected circuits 2 and 3 of each of the upper and lower coil pieces 15 and 16 in the first and second phase belts 17 and 18 show a high degree of balance, thereby obtaining a high degree of balance of generated voltages of the three parallel connected circuits 1 to 3 can be obtained as shown in Table 3 below.

TABLE 3

| Circuit Number | 1 | 2 | 3 |
|---|---|---|---|
| Voltage magnitude (p.u.) | 1.0008 | 1.0014 | 0.9977 |
| Voltage phase angle (deg.) | 0.000 | −0.032 | 0.032 |

As described above, by providing only three sets of (that is, six) jumper wires for each phase, it is possible to reduce voltage unbalance among the parallel connected circuits 1 to 3. Thus, it is possible to minimize the increase of the axial dimensions of the coil ends due to the installed jumper wires 19e and 19f, 24d and 24e and 29a and 29b, respectively and the increase of workload resulting from the connection of the jumper wires. Although these effects in this embodiment are slightly smaller than those in the first embodiment since the number of the jumper wires 19e to 29b is slightly higher than that in the first embodiment, a higher degree of voltage balance can be obtained in this embodiment, thereby making it possible to further prevent the increase of loss and temperature rise caused by circulating current.

In a case of calculating the degree of balance in Table 1, it is assumed that the magnetic pole of a rotor, which is not shown, rotates right to left in FIG. 1 with respect to the armature winding 14 shown in FIG. 1. Therefore, when the constitution of the armature winding 14 is the same as that shown in FIG. 1 and the magnetic pole of the rotor rotates right to left in FIG. 1, the degree of balance of the voltage generated at the armature winding is as shown in Table 4 below. Table 4 differs from Table 1 only in that the phases of the parallel connected circuits 2 and 3 are opposite to those in Table 1.

TABLE 4

| Circuit Number | 1 | 2 | 3 |
|---|---|---|---|
| Voltage magnitude (p.u.) | 1.0016 | 0.9966 | 1.0018 |
| Voltage phase angle (deg.) | 0.000 | −0.121 | 0.121 |

When circulating current occurs across the parallel connected circuits 1 to 3 due to voltage unbalance among the parallel connected circuits 1, 2 and 3, the main component of the impedance of a circulating current circuit is leakage reactance of the armature winding. Therefore, the phase of the circulating current is lagging by substantially 90 degrees with respect to that of the unbalanced voltage. From this, it is seen that when the unbalanced voltage contains leading phase components with respect to the rated voltage, the induced circulating current contains components equal to those of the rated voltage in phase. Since a generator is normally operated in a state that the phase of the voltage is close to that of the current (power factor 1), even if the absolute values of the circulating currents are the same, circulating current loss increases by the superimposing function between the circulating current and the armature current as the circulating current contains more components equal to those of the rated voltage in phase.

Because, shown in Table 3, the voltage generated at the parallel connected circuit 3 which has the highest unbalanced voltage has an leading phase with respect to the rated voltage, the circulating current loss in Table 3 can be greater than that in a case where the voltage generated at the parallel connected circuit 3 is lagging in phase with respect to the rated voltage as shown in Table 1.

Figure 5:
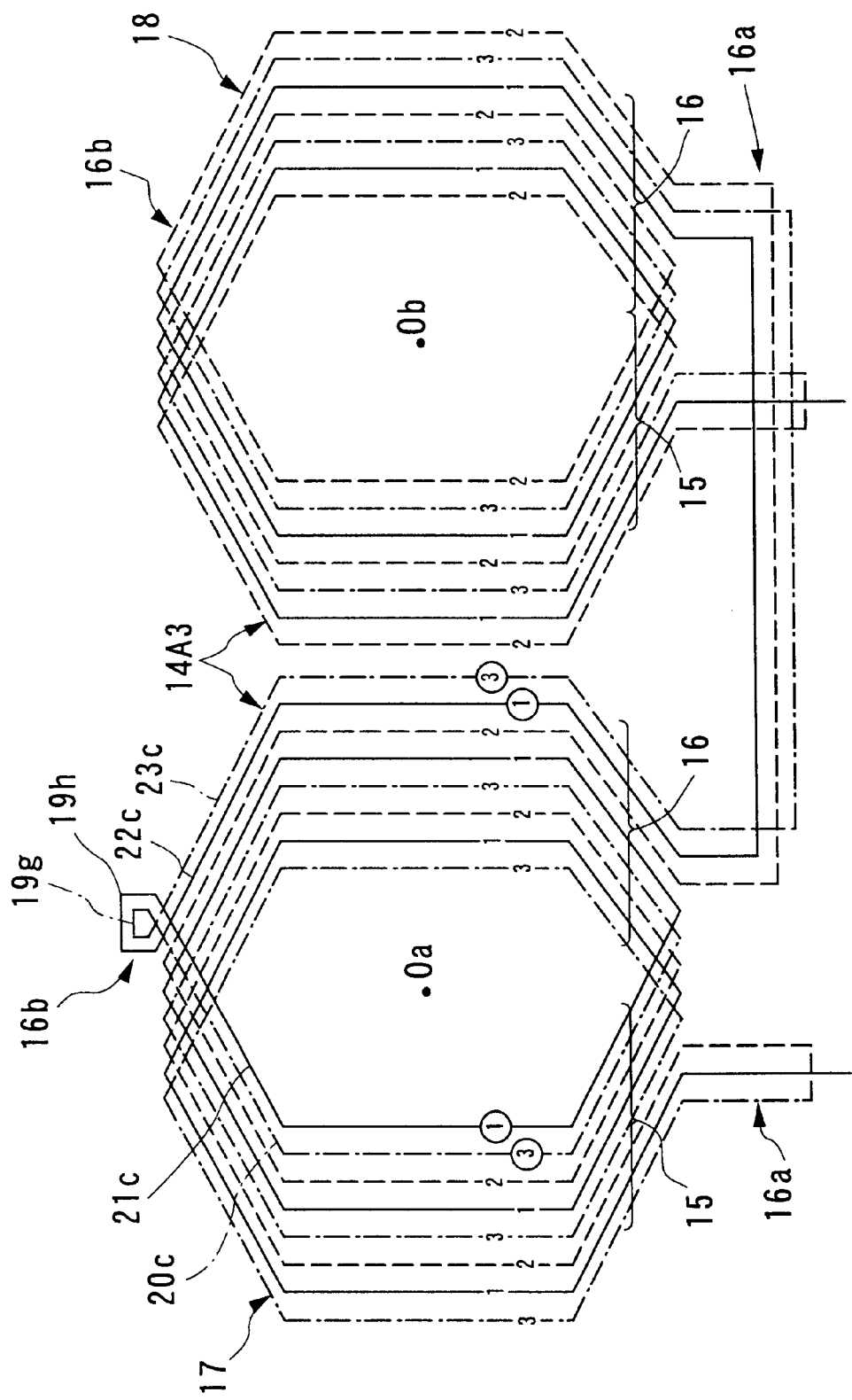
FIG. 5 is a developed view of a phase of an armature winding according to a fourth embodiment of the present invention.

FIG. 5 is a developed view of an armature winding 14A3 of a turbine generator according to the fourth embodiment of the present invention. In this embodiment, in a case of a two-pole, 45 slot core 12, similarly to the first embodiment, the three phases 14A3–14C3 of the winding 11 are contained within the 45 slots 13, respectively. That is, in a case of 45 slots 13, 15 slots 13 are allocated to each of the phases 14A3–14C3 of the winding 11.

In this embodiment, a set of two jumper wires 19g and 19h in the first phase belts 17 are provided at a position which is symmetrical through the center Oa of the first phase belts 17 with respect to the jumper wires 19a and 19b according to the first embodiment shown in FIG. 1.

That is, the set of jumper wires 19g and 19h is provided at a non-connection coil end 16b in the first phase belt 17, whereby the seventh and eighth upper coil pieces 20c and 21c from the beginning of the upper coil pieces 15 (upper-left piece in FIG. 5) in the first phase belts 17 toward the right-side end in FIG. 5, which have circuit numbers 3 and 1, respectively, and the seventh and eighth lower coil pieces 22c and 23c from the beginning of the lower coil pieces 16 (left-end piece in FIG. 5) in the same first phase belt 17, which have the circuit numbers 1 and 3, respectively, are connected so that the circuit sequence of the seventh and eighth upper coil pieces 20c and 21c is interchanged with that of the seventh and eighth lower coil pieces 22c and 23c.

Therefore, the circuit sequence of the upper coil pieces 15 in the first phase belts 17 is 3, 1, 2, 3, 1, 2, 3, 1 from the beginning toward the end of the upper coil pieces 15, and the circuit sequence of the lower coil pieces is 3, 1, 2, 3, 1, 2, 1, 3 from the beginning toward the end of the lower coil pieces 16. In addition, the circuit sequence of the upper coil pieces 15 and that of the lower coil pieces 16 in the second phase belts 18 are 2, 1, 3, 2, 1, 3, 2 from the left end toward the right side.

Incidentally, the other phases 14B3 and 14C3 of the armature winding 11 has the same structure of the phase 14A3 thereof, so that circuit sequences of the other phases 14B3 and 14C3 in the first phase belts 17 and the second phase belts 18 are identical to those of the phase 14A3 therein. Therefore, the descriptions of the structures of the phases 14B3 and 14C3 are omitted.

With this constitution, when the magnetic pole of a rotor, which is not shown, rotates left to right in FIG. 5, the voltages generated at the respective parallel connected circuits 1, 2 and 3 are the same as those shown in Table 1 and the voltage generated at the circuit 3 is lagging in phase with respect to the rated voltage, thereby reducing circulating current loss more efficiently than that shown in FIG. 1.

Thus, by using a connection system in which the voltage generated at the circuit 3 having the highest unbalanced voltage is lagging in phase with respect to the rated voltage according to the rotating direction of the rotor, even if the parallel connected circuits 1 to 3 have the same degree of voltage balance, it is possible to provide the armature winding 14A3 having a lesser circulating current loss. In this embodiment, the jumper wires 19g and 19h are applied to the armature winding 14A3 which has substantially the same construction of the armature winding 14A shown in FIG. 1 as an example. However, the present invention is not limited to the structure. That is, the jumper wires 19g and 19h may be applicable to the armature windings 14A1 and 14A2 recited in the second and third embodiments, respectively.

Figure 6:
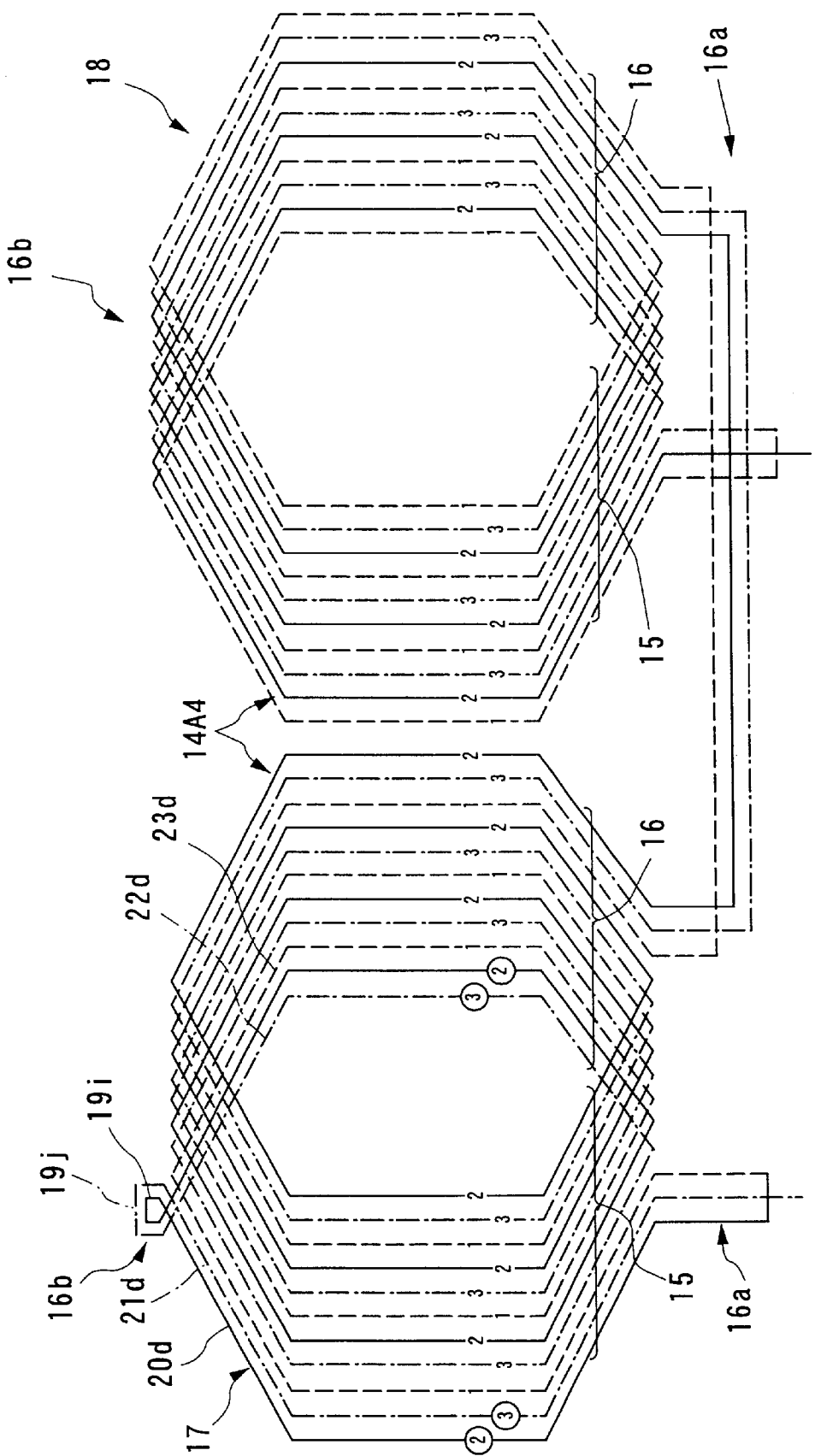
FIG. 6 is a developed view of a phase of an armature winding according to a fifth embodiment of the present invention.

FIG. 6 is a development of an armature winding 14A4 of a turbine generator according to the fifth embodiment of the present invention. In this embodiment, in a case where a number of slots 13 is 63, the three phases 14A4–14C4 of the winding 11 are contained within the 63 slots 13, respectively. That is, in a case of 63 slots 13, 21 slots 13 are allocated to each of the phases 14A4–14C4 of the winding 11.

In the armature winding (phase) 14A4, in a case where a number of slots of the core is 63, eleven slots 13 are classified as the first slot group corresponding to the first phase belt 17, and ten slots 13 are classified as the second slot group corresponding to the second phase belt 18.

The first phase belts 17 is adapted to house the eleven coils with the upper coil pieces 15 and the lower coil pieces 16 in the first slot group of eleven slots 13 and the second phase belts 18 is adapted to house the ten coils with the upper coil pieces 15 and the lower coil pieces 16 in the second slot group of ten slots 13.

In addition, in this embodiment, a set of two jumper wires 19i and 19j is provided at a non-connection side coil end 16b in the first phase belts 17 accommodated in the eleven slots 13.

That is, the set of jumper wires 19i and 19j is provided at the non-connection side coil end 16b in the first phase belt 17, whereby the first and second upper coil pieces 20d and 21d from the left-end upper piece 15 toward the right side in the first phase belt 17, which have circuit numbers 2 and 3, respectively, and the first and second lower coil pieces 22d and 23d in the first phase belt 17, which have circuit numbers 3 and 2, respectively, are connected so that the circuit sequence of the first and second upper coil pieces 20d and 21d is interchanged with that of the first and second lower coil pieces 22d and 23d.

Therefore, the circuit sequence of the upper coil pieces 15 is 2, 3, 1, 3, 2, 1, 3, 2, 1, 3, 2 from left to right in FIG. 6 and that of the lower coil pieces 16 is 3, 2, 1, 3, 2, 1, 3, 2, 1, 3, 2 from left to right in the first phase belt 17. Each of the circuit sequences of the upper and lower coil pieces 15 and 16 accommodated in 11 slots 13 in the second phase belts 18 is 1, 2, 3, 1, 2, 3, 1, 2, 3, 1 from left to right.

Incidentally, the other phases 14B4 and 14C4 of the armature winding 11 has the same structure of the phase 14A4 thereof, so that circuit sequences of the other phases 14B4 and 14C4 in the first phase belts 17 and the second phase belts 18 are identical to those of the phase 14A4 therein. Therefore, the descriptions of the structures of the phases 14B4 and 14C4 are omitted.

Thus, in this embodiment, the function and advantage of this embodiment using the armature winding 14A4 to 14C4 are substantially the same as those of the first embodiment so that it is possible to provide a high degree of balance of generated voltages as shown in Table 5 below.

TABLE 5

| Circuit Number | 1 | 2 | 3 |
|---|---|---|---|
| Voltage magnitude (p.u.) | 1.0008 | 0.9982 | 1.0009 |
| Voltage phase angle (deg.) | 0.000 | 0.066 | −0.066 |

Figure 7:
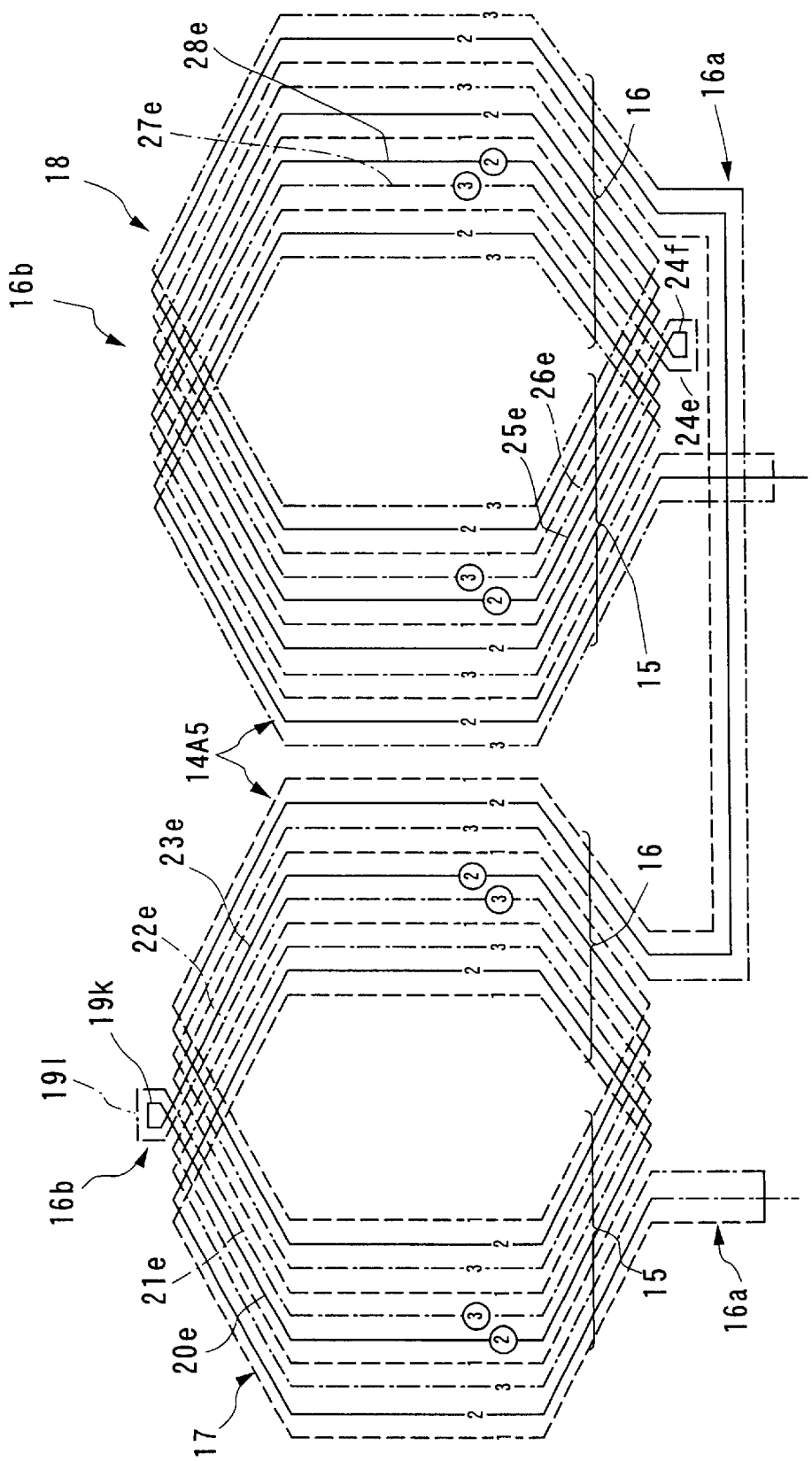
FIG. 7 is a developed view of a phase of an armature winding according to a sixth embodiment of the present invention.

FIG. 7 is a development of an armature winding 14A5 of a turbine generator according to the sixth embodiment of the present invention. In this embodiment, in a case where a number of slots 13 is 63, the three phases 14A5–14C5 of the winding 11 are contained within the 63 slots 13, respectively. That is, in a case of 63 slots 13, 21 slots 13 are allocated to each of the phases 14A5–14C5 of the winding 11.

In the armature winding (phase) 14A5 in a case where a number of slots of the core is 63, ten slots 13 are classified as the first slot group corresponding to the first phase belt 17, and eleven slots 13 are classified as the second slot group corresponding to the second phase belt 18.

The first phase belts 17 is adapted to house the ten coils with the upper coil pieces 15 and the lower coil pieces 16 in the first slot group of ten slots 13 and the second phase belts 18 is adapted to house the eleven coils with the upper coil pieces 15 and the lower coil pieces 16 in the second slot group of eleven slots 13.

In addition, in this embodiment, a set of two jumper wires 19k and 19l is provided at a non-connection side coil end 16b in the first phase belts 17 accommodated in the ten slots 13, and a set of two jumper wires 24e and 24f is provided at a connection side coil end 16a in the second phase belt 18.

That is, the set of jumper wires 19k and 19l is provided at the non-connection side coil end 16b in the first phase belt 17, whereby the fifth and sixth upper coil pieces 20e and 21e from the left-end upper piece 15 of the first phase belts 17 toward the right side in FIG. 6, which have circuit numbers 2 and 3, respectively, and the fifth and sixth lower coil pieces 22e and 23e from the left-end lower piece 16 toward the right side in the first phase belt 17, which have circuit numbers 3 and 2, respectively, are connected so that the circuit sequence of the fifth and sixth upper coil pieces 20e and 21e is interchanged with that of the fifth and sixth lower coil pieces 22e and 23e.

Therefore, the circuit sequence of the upper coil pieces 15 in the first phase belts 17 is 1, 2, 3, 1, 2, 3, 1, 3, 2, 1 from the left end toward the right side in FIG. 7. The circuit sequence of the lower coil pieces 16 in the first phase belts 17 are 1, 2, 3, 1, 3, 2, 1, 3, 2, 1 from the left end toward the right side in FIG. 7.

Furthermore, the other set of jumpers 24e and 24f is provided at the connection side coil end 16a in the second phase belt 18, whereby the seventh and eighth upper coil pieces 25e and 26e from the left-end upper coil 15 toward the right side of the second phase belts 18 in FIG. 6, which have circuit numbers 2 and 3, respectively, and the fourth and fifth lower coil pieces 27 and 28e, which have circuit numbers 3 and 2, are connected so that the circuit sequence of the seventh and eighth upper coil pieces 25e and 26e is interchanged with that of the fourth and fifth lower coil pieces 27e and 28e.

Therefore, the circuit sequence of the upper coil pieces 15 and that of the lower coil pieces 16 in the second phase belts 18 are 3, 2, 1, 3, 2, 1, 2, 3, 1, 2, 3 from the left end toward the right side in FIG. 7.

Incidentally, the other phases 14B5 and 14C5 of the armature winding 11 has the same structure of the phase 14A5 thereof, so that circuit sequences of the other phases 14B5 and 14C5 in the first phase belts 17 and the second phase belts 18 are identical to those of the phase 14A5 therein. Therefore, the descriptions of the structures of the phases 14B5 and 14C5 are omitted.

Therefore, the function and advantage of this embodiment using the armature winding 14A5 to 14C5 are substantially the same as those of the second embodiment so that it is possible to provide a high degree of balance of generated voltages as shown in Table 6 below.

TABLE 6

| Circuit Number | 1 | 2 | 3 |
|---|---|---|---|
| Voltage magnitude (p.u.) | 1.0008 | 1.0060 | 0.9932 |
| Voltage phase angle (deg.) | 0.000 | 0.000 | 0.000 |

Incidentally, in the above embodiments, the jumper wires are employed in order to connect the upper coil pieces and the lower coil pieces. However, the present invention is not limited to the structure. That is, any electrical connection member can be employed in place of the jumper wire.

While there has been described what is at present considered to be the preferred embodiments and modifications of the present invention. It will be understood that various modifications which are not described yet may be made therein, and it is intended to cover in the appended claims all such modifications as fall within the true spirit and scope of the invention.

What is claimed is:

1. A three phase armature winding for a dynamo-electric machine, in which the three phase armature winding is disposed in a core, said core having a number of slots, each phase of said armature winding comprising:

a first phase belt for a first slot group having 11 slots;

a second phase belt for a second slot group having 10 slots;

three parallel connected circuits including circuit 1, circuit 2, and circuit 3, each circuit comprising a number of series connected coils in each of the first and second phase belts, the number of coils provided by each of at least two circuits of said circuit 1, said circuit 2, and said circuit 3 in the first phase belt and the number of coils provided by each of said at least two circuits in the second phase belt being different from each other, each of said series connected coils including a first coil piece and a second coil piece connected thereto in series, each of said first coil pieces and said second coil pieces having a first end portion and a second end portion;

a pair of connection members mounted at the second end portion of the series connected coils in the first phase belt; and a two layer lap winding;

wherein said slots are arranged in sequence about a roter, said first phase belt houses 11 series connected coils of the parallel connected circuits and said second phase belt houses 10 series connected coils thereof, the first coil pieces of the at least two circuits and the second coil pieces thereof in the first phase belt are connected by the pair of connection members such that a circuit sequence of the first coil pieces in the first phase belt and a circuit sequence of the second coil pieces therein are different in order that said circuit sequence of the first coil pieces of the at least two circuits in the first phase belt and the circuit sequence of the second coil pieces of the at least two circuits therein are reversed, said circuit sequences of the first and second coil pieces of the parallel connected circuits in the second phase belt are 1, 2, 3, 1, 2, 3, 1, 2, 3, 1 from a beginning of the first coil pieces in the first phase belt toward an end of the second coil pieces in the second phase belt, said circuit sequence of the first coil pieces of the parallel connected circuits in the first phase belt is 2, 3, 1, 3, 2, 1, 3, 2, 1, 3, 2 from the beginning side toward the end side, and said circuit sequence of the second coil pieces of the parallel connected circuits in the first phase belt is 3, 2, 1, 3, 2, 1, 3, 2, 1, 3, 2 from the beginning side toward the end side.

2. A three phase armature winding according to claim 1, wherein said first end portion of each of the first coil pieces in each phase belt is connected to one of a lead portion and corresponding second coil piece in each phase belt, and said second end portion of each of the first coil pieces in each phase belt is connected to corresponding second coil piece in each phase belt and is not connected to the lead portion.

3. A three phase armature winding according to claim 1, wherein an arrangement position of each of the jumper wires is determined so that a voltage unbalance among the three parallel connected circuits is reduced and a phase of a highest voltage in voltages induced in the respective parallel connected circuits is lagging with respect to a phase of an average voltage of a whole phase.

4. A three phase armature winding according to claim 1, wherein a difference among each number of coils of each of the parallel connected circuits in each of the first and second phase belts is 1 or less, and said portion of the first coil pieces in the first phase belt and said portion of the second coil pieces therein are adjacent with each other.

5. A three phase armature winding according to claim 1, wherein the connection members are jumper wires.

6. A three phase armature winding for a dynamo-electric machine, in which the three phase armature winding is disposed in a core, said core having a number of slots, each phase of said armature winding comprising:

a first phase belt for a first slot group having 10 slots;

a second phase belt for a second slot group having 11 slots;

three parallel connected circuits including circuit 1, circuit 2, and circuit 3, each circuit comprising a number of series connected coils in each of the first and second phase belts, the number of coils provided by each of at least two circuits of said circuit 1, said circuit 2, and said circuit 3 in the first phase belt and the number of coils provided by each of said at least two circuits in the second phase belt being different from each other, each of said series connected coils including a first coil piece and a second coil piece connected thereto in series, each of said first coil pieces and said second coil pieces having a first end portion and a second end portion;

a first pair of connection members mounted at the second end portion of the series connected coils in the first phase belt; and a second pair of connection members mounted at the first end portion of the series connected coils in the second phase belt;

wherein said first phase belt houses 11 series connected coils of the parallel connected circuits and said second phase belt houses 10 series connected coils thereof, the first coil pieces of the at least two circuits and the second coil pieces thereof in the first phase belt are connected by the first pair of connection members such that a circuit sequence of the first coil pieces in the first phase belt and a circuit sequence of the second coil pieces therein are different in order that said circuit sequence of the first coil pieces of the at least two circuits in the first phase belt and the circuit sequence of the second coil pieces of the at least two circuits therein are reversed, and the first coil pieces of the at least two circuits and the second coil pieces thereof in the second phase belt are connected by the second pair of connection members such that a circuit sequence of the first coil pieces in the second phase belt and a circuit sequence of the second coil pieces therein are different in order that said circuit sequence of the first coil pieces of the at least two circuits in the second phase belt and the circuit sequence of the second coil pieces of the at least two circuits therein are reversed, said circuit sequence of the first coil pieces of the parallel connected circuits in the first phase belt is 1, 2, 3, 1, 2, 3, 1, 3, 2, 1 from a beginning of the first coil pieces in the first phase belt toward an end of the second coil pieces in the second phase belt, said circuit sequence of the second coil pieces of the parallel connected circuits in the first phase belt is 1, 2, 3, 1, 3, 2, 1, 3, 2, 1 from the beginning side toward the end side, and said circuit sequences of the first and second coil pieces of the parallel connected circuits in the second phase belt are 3, 2, 1, 3, 2, 1, 2, 3, 1, 2, 3 from the beginning side toward the end side.

7. A three phase armature winding according to claim 6, wherein each of said connection members is a jumper wire.

8. A three phase armature winding according to claim 6, wherein a difference among each number of coils of each of the parallel connected circuits in each of the first and second phase belts is 1 or less, said portion of the first coil pieces in the first phase belt and said portion of the second coil pieces therein are adjacent with each other, and said portion of the first coil pieces in the second phase belt and said portion of the second coil pieces therein are adjacent with each other.

9. A three phase armature winding for a dynamo-electric machine, in which the three phase armature winding is disposed in a core, said core having a number of slots, each phase of said armature winding comprising:

a first phase belt for a first slot group having 10 slots;

a second phase belt for a second slot group having 11 slots;

three parallel connected circuits including circuit 1, circuit 2, and circuit 3, each circuit comprising a number of series connected coils in each of the first and second phase belts, the number of coils provided by each of at least two circuits of said circuit 1, said circuit 2, and said circuit 3 in the first phase belt and the number of coils provided by each of said at least two circuits in the second phase belt being different from each other, each of said series connected coils including a first coil piece and a second coil piece connected thereto in series, each of said first coil pieces and said second coil pieces having a first end portion and a second end portion;

a pair of connection members mounted at the second end portion of the series connected coils in the first phase belt; and two pair of connection members mounted at the first end portion of the series connected coils in the second phase belt;

wherein said first phase belt houses 10 series connected coils of the parallel connected circuits and said second phase belt houses 11 series connected coils thereof, the first coil pieces of the at least two circuits and the second coil pieces thereof in the first phase belt are connected by the first pair of connection members such that a circuit sequence of the first coil pieces in the first phase belt and a circuit sequence of the second coil pieces therein are different in order that said circuit sequence of the first coil pieces of the at least two circuits in the first phase belt and the circuit sequence of the second coil pieces of the at least two circuits therein are reversed, and two pairs of the first coil pieces of the at least two circuits and the second coil pieces thereof in the second phase belt are connected by the two pair of connection members such that a circuit sequence of the first coil pieces in the second phase belt and a circuit sequence of the second coil pieces therein are different in order that said circuit sequence of the first coil pieces of the at least two circuits in the second phase belt and the circuit sequence of the at least two circuits therein are reversed, said circuit sequence of the first coil pieces of the parallel connected circuits in the first phase belt is 1, 2, 3, 1, 2, 3, 1, 3, 2, 1 from a beginning of the first coil pieces in the first phase belt toward an end of the second coil pieces in the second phase belt, said circuit sequence of the second coil pieces of the parallel connected circuits in the first phase belt is 1, 2, 3, 1, 3, 2, 1, 3, 2, 1 from the beginning side toward the end side, said circuit sequence of the first coil pieces of the parallel connected circuits in the second phase belt is 3, 2, 1, 3, 2, 1, 2, 3, 1, 2, 3 from the beginning side toward the end side, and wherein said circuit sequence of the second coil pieces of the parallel connected circuits in the second phase belt is 3, 2, 1, 2, 3, 1, 2, 3, 1, 3, 2 from the beginning side toward the end side.

10. A three phase armature winding according to claim 9, wherein each of said connection members is a jumper wire.

11. A three phase armature winding according to claim 9, wherein a difference among each number of coils of each of the parallel connected circuits in each of the first and second phase belts is 1 or less, said portion of the first coil pieces in the first phase belt and said portion of the second coil pieces therein are adjacent with each other, and said portion of the first coil pieces in the second phase belt and said portion of the second coil pieces therein are adjacent with each.

12. A three phase armature winding for a dynamo-electric machine, in which the three phase armature winding is disposed in a core, said core having a number of slots, each phase of said armature winding comprising:

a first phase belt for a first slot group having 8 slots;

a second phase belt for a second slot group having 7 slots;

three parallel connected circuits including circuit 1, circuit 2, and circuit 3, each circuit comprising a number of series connected coils in each of the first and second phase belts, the number of coils provided by each of at least two circuits of said circuit 1, said circuit 2, and said circuit 3 in the first phase belt and the number of coils provided by each of said at least two circuits in the second phase belt being different from each other, each of said series connected coils including a first coil piece and a second coil piece connected thereto in series, each of said first coil pieces and said second coil pieces having a first end portion and a second end portion; and a pair of connection members mounted at the second end portion of the series connected coils in the first phase belt;

wherein said first phase belt houses 8 series connected coils of the parallel connected circuits and said second phase belt houses 7 series connected coils thereof, the first coil pieces of the at least two circuits and the second coil pieces thereof in the first phase belt are connected by the pair of connection members such that a circuit sequence of the first coil pieces in the first phase belt and a circuit sequence of the second coil pieces therein are different in order that said circuit sequence of the first coil pieces of the at least two circuits in the first phase belt and the circuit sequence of the second coil pieces of the at least two circuits therein are reversed, said circuit sequence of the first coil pieces of the parallel connected circuits in the first phase belt is 2, 3, 1, 3, 2, 1, 3, 2 from a beginning of the first coil pieces in the first phase belt toward an end of the second coil pieces in the second phase belt, said circuit sequence of the second coil pieces of the parallel connected circuits in the first phase belt is 3, 2, 1, 3, 2, 1, 3, 2 from the beginning side toward the end side, and wherein said circuit sequences of the first and second coil pieces of the parallel connected circuits in the second phase belt are 1, 2, 3, 1, 2, 3, 1 from the beginning side toward the end side.

13. A three phase armature winding for a dynamo-electric machine, in which the three phase armature winding is disposed in a core, said core having a number of slots, each phase of said armature winding comprising:

a first phase belt for a first slot group having 8 slots;

a second phase belt for a second slot group having 7 slots;

three parallel connected circuits including circuit 1, circuit 2, and circuit 3, each circuit comprising a number of series connected coils in each of the first and second phase belts, the number of coils provided by each of at least two circuits of said circuit 1, said circuit 2, and said circuit 3 in the first phase belt and the number of coils provided by each of said at least two circuits in the second phase belt being different from each other, each of said series connected coils including a first coil piece and a second coil piece connected thereto in series, each of said first coil pieces and said second coil pieces having a first end portion and a second end portion;

a first pair of connection members mounted at the second end portion of the series connected coils in the first phase belt; and a second pair of connection members mounted at the first end portion of the series connected coils in the second phase belt;

wherein said first phase belt houses 8 series connected coils of the parallel connected circuits and said second phase belt houses 7 series connected coils thereof, the first coil pieces of the at least two circuits and the second coil pieces thereof in the first phase belt are connected by the first pair of connection members such that a circuit sequence of the first coil pieces in the first phase belt and a circuit sequence of the second coil pieces therein are different in order that said circuit sequence of the first coil pieces of the at least two circuits in the first phase belt and the circuit sequence of the second coil pieces of the at least two circuits therein are reversed, and the first coil pieces of the at least two circuits and the second coil pieces thereof in the second phase belt are connected by the second pair of connection members such that a circuit sequence of the first coil pieces in the second phase belt and a circuit sequence of the second coil pieces therein are different in order that said circuit sequence of the first coil pieces of the at least two circuits in the second phase belt and the circuit sequence of the second coil pieces of the at least two circuits therein are reversed, said circuit sequence of the first coil pieces of the parallel connected circuits in the first phase belt is 2, 3, 1, 2, 3, 1, 3, 2 from a beginning of the first coil pieces in the first phase belt toward an end of the second coil pieces in the second phase belt, said circuit sequence of the second coil pieces of the parallel connected circuits in the first phase belt is 2, 3, 1, 3, 2, 1, 3, 2 from the beginning side toward the end side, and wherein said circuit sequences of the first and second coil pieces of the parallel connected circuits in the second phase belt are 1, 3, 2, 1, 2, 3, 1 from the beginning side toward the end side.

* * * * *